US008634086B2

(12) United States Patent
Boeck et al.

(10) Patent No.: US 8,634,086 B2
(45) Date of Patent: Jan. 21, 2014

(54) TANDEM PRINTING SYSTEM AND METHOD TO CONTROL A TANDEM PRINTING SYSTEM, AND COMPUTER SYSTEM, AND COMPUTER PROGRAM PRODUCT

(75) Inventors: Heinz Boeck, Taufkirchen (DE); Hubert Drexler, Taufkirchen (DE); Bernd Hausmann, Maisach (DE); Ernst Engst, Unterschleissheim (DE); Martin Stockmar, Poing (DE); Christian Fertl, Munich (DE)

(73) Assignee: Océ Printing Systems, GmbH, Poing (DE)

( * ) Notice: Subject to any disclaimer, the term of this patent is extended or adjusted under 35 U.S.C. 154(b) by 87 days.

(21) Appl. No.: 13/357,235

(22) Filed: Jan. 24, 2012

(65) Prior Publication Data

US 2012/0186475 A1 Jul. 26, 2012

(30) Foreign Application Priority Data

Jan. 24, 2011 (DE) ........................ 10 2011 000 296

(51) Int. Cl.
*G06F 15/00* (2006.01)

(52) U.S. Cl.
USPC ........................................................ 358/1.13

(58) Field of Classification Search
USPC ........................................................ 358/1.15
See application file for complete search history.

(56) References Cited

U.S. PATENT DOCUMENTS

| | | | | |
|---|---|---|---|---|
| 4,774,524 | A | 9/1988 | Warbus et al. | |
| 5,034,878 | A | 7/1991 | Haapala et al. | |
| 5,829,707 | A * | 11/1998 | Lamothe | 242/538.2 |
| 6,151,298 | A | 11/2000 | Bernhardsson et al. | |
| 6,865,460 | B2 | 3/2005 | Bray et al. | |
| 7,199,886 | B2 | 4/2007 | Brandl | |
| 7,541,830 | B2 | 6/2009 | Fahrbach et al. | |
| 2002/0015177 | A1 | 2/2002 | Yamakado et al. | |
| 2003/0131159 | A1 | 7/2003 | Gregory et al. | |
| 2004/0263903 | A1 | 12/2004 | Oikawa | |
| 2006/0039727 | A1 * | 2/2006 | Lofthus et al. | 399/381 |
| 2009/0185215 | A1 | 7/2009 | Kreppold et al. | |

FOREIGN PATENT DOCUMENTS

| | | |
|---|---|---|
| DE | 19836745 A1 | 2/2000 |
| WO | 02056545 | 7/2002 |
| WO | 2004062219 | 7/2004 |
| WO | 2007122229 | 11/2007 |

OTHER PUBLICATIONS

Dr. Dieter Joergens, The SRA Controller, Oce technology, pp. 249-258, 2005.
QuickSpecs—HP BladeSystem c3000 Enclosure, Worldwide—Version 31—Nov. 15, 2010.

* cited by examiner

*Primary Examiner* — Saeid Ebrahimi Dehkordy
(74) *Attorney, Agent, or Firm* — Schiff Hardin LLP

(57) ABSTRACT

In a printing system or method a first printing apparatus and a second printing apparatus are respectively selectively operable in simplex mode and duplex mode. Each of the printing apparatuses in simplex mode process print jobs independently of the respective other printing apparatus, and in duplex mode processing print jobs jointly by both of the printing apparatuses. The printing apparatuses are connected with one another for control at least in duplex mode. An activation operating unit is provided via which at least one of the two printing apparatuses is selectively activated for the simplex mode or both of the printing apparatuses are selectively activated for the duplex mode.

22 Claims, 3 Drawing Sheets

TANDEM PRINTING SYSTEM AND METHOD TO CONTROL A TANDEM PRINTING SYSTEM, AND COMPUTER SYSTEM, AND COMPUTER PROGRAM PRODUCT

RELATED APPLICATION

The present application is related to application Ser. No. 13/357,125 "PRINTING SYSTEM WITH MULTIPLE DATA BUS SEGMENTS" filed Jan. 24, 2012, inventor Boeck et al.

BACKGROUND

The disclosure concerns a tandem printing system and a method to control such a printing system, as well as a computer system and a computer program product.

Tandem printing systems comprise at least two printing apparatuses that are connected with one another (in terms of control systems) in a detachable manner. The disclosure concerns a tandem printing system that in particular has two digital high-capacity printing apparatuses and that is optionally operable in a simplex operating mode and a duplex operating mode. In particular, in a simplex operating mode each of the two printing apparatuses can process print jobs independent of a respective other printing apparatus, without the printing apparatuses being connected with one another in terms of their control, and in a duplex operating mode print jobs can respectively be processed jointly by both printing apparatuses, wherein they are connected with one another in terms of their control.

For example, such digital high-capacity printing systems are used in print production centers in which print goods are generated with high speed. Print jobs in such print centers are in particular individualized per page, and typically are comprised of a few hundred to hundreds of thousands of pages. The processing of the pages therefore requires both a high data processing speed in the processing of print jobs and a high print speed in the printing device. Typical print speeds of a few hundred to multiple thousands of A4 pages per minute are thereby typically achieved. For example, the print technology can be based on electrographic or magnetographic methods, or on the principle of inkjet printing; however, it is not limited to these technologies and can also comprise a combination of multiple technologies, for example of printing system parts that print by means of offset methods and printing system parts that print by means of the inkjet technique.

From U.S. Pat. No. 4,774,524 A a digital tandem printing system is known in which the two printing apparatuses are connected on a first control layer (data control layer) to a common external data source, namely to a host computer that supplies print data to the printing apparatuses. The printing apparatuses are additionally connected with one another directly in terms of their control on a second control layer (device control layer), via which they are synchronized such that the page association between the images printed by both apparatuses is correct. This is important in particular given a double-sided printing (duplex printing) in which the front side of documents to be printed is respectively printed by the first printing apparatus and the back side is respectively printed by the second printing apparatus.

In the publication "Digital Printing, M. Hoffman-Falk (publisher), Océ Printing Systems GmbH, 9th edition (2005), ISBN 3-00-00108-5, a computer system for a raster image controller with the brand name Océ SRA Controller is described on Pages 250 through 258. A computer system with a print server for high-capacity printing systems with the brand name Océ PRISMAproduction Server, with which print jobs are administered and output to print apparatuses, is described on Pages 347 through 361.

Computer modules with which computers can be modularly combined like plug-in cards into a computer system are offered and distributed by the Hewlett-Packard Development Company, L.P. (hp) under the name HP Blade System c3000. They are described in the brief description "QuickSpecs", hp Publication Number DA-12790 Worldwide, Version 31 (15 Nov. 2010), which is available as a PDF document on the Internet. What is known as the enclosure thereby corresponds to a frame on which infrastructure components (such as power supply, fan or even network interfaces) are already located beforehand, which components are respectively used jointly by the respective inserted plug-in cards. Moreover, the plug-in cards (blades) for their part are respective powerful computers with typical structural elements such as microprocessors (CPUs), memories etc.

If printing apparatuses of a tandem printing system are operated individually, independently of one another, typical individual different apparatus adjustments are then made in the respective apparatuses, for example with regard to the supported page description languages (PDLs) of the print job data, for example Page Definition Format (PDF), PostScript (PS) or Intelligent Printer Data Stream (IPDS). Parameters such as width, length or type of the recording material, print speed, print image resolution and type and number of the printing substances or printing inks can also be set differently. However, certain settings must be the same in both apparatuses for the duplex mode, for example the supported page description language. However, the reconfiguration of such settings can mean a significant cost because it demands a plurality of new data to be loaded and activated, and even requires a complete restart of the respective apparatus with the new settings under the circumstances.

This can be time- and work-intensive and reduce the productivity of the apparatus, in particular if an operator must simultaneously monitor (and possibly adjust) multiple printing apparatuses in a print center.

A method to configure the apparatus settings of a printing apparatus in the course of the activation process is known in U.S. Pat. No. 7,199,886 B2, wherein the support for page description languages can be configured (among other things).

In the US patent application (submitted simultaneously with this Application) with the applicant's Ser. No. 13/357,125 and the title "PRINTING SYSTEM WITH MULTIPLE DATA BUS SEGMENTS", a tandem printing system is described in which internal apparatus controllers of the two printing apparatuses (printing units) can be connected with one another via a control line (in particular via a CAN bus) so as to be detachable, wherein the connection is detached in simplex mode and the connection is established in duplex mode. Each printing unit has multiple sub-modules (apparatuses) with a respective microprocessor controller, wherein the microprocessor controllers of a printing unit are connected with one another with a respective data bus segment. Each data bus segment has multiple data lines. The at least two data bus segments of the two printing units are connected with one another with a bus switch. For each data line the bus switch has a respective data switch to connect a respective data line of the one data bus segment with the corresponding data line of the other data bus segment, and a respective terminating resistor for each data bus segment, wherein the terminating resistors are connected in series with a respective terminating switch, and the terminating switches are coupled with the data switches such that either all terminating switches are opened and all data switches are closed, or all terminating switches are closed and all data switches are opened.

The aforementioned publications or, respectively, the contents of the patent applications are herewith incorporated by reference into the present Specification.

SUMMARY

It is an object to enable a simple and secure switching between a simplex operation and a duplex operation of the printing apparatuses.

In a printing system or method a first printing apparatus and a second printing apparatus are respectively selectively operable in simplex mode and duplex mode. Each of the printing apparatuses in simplex mode process print jobs independently of the respective other printing apparatus, and in duplex mode processing print jobs jointly by both of the printing apparatuses. The printing apparatuses are connected with one another for control at least in duplex mode. An activation operating unit is provided via which at least one of the two printing apparatuses is selectively activated for the simplex mode or both of the printing apparatuses are selectively activated for the duplex mode.

DESCRIPTION OF PREFERRED EXEMPLARY EMBODIMENTS

Figure 1:
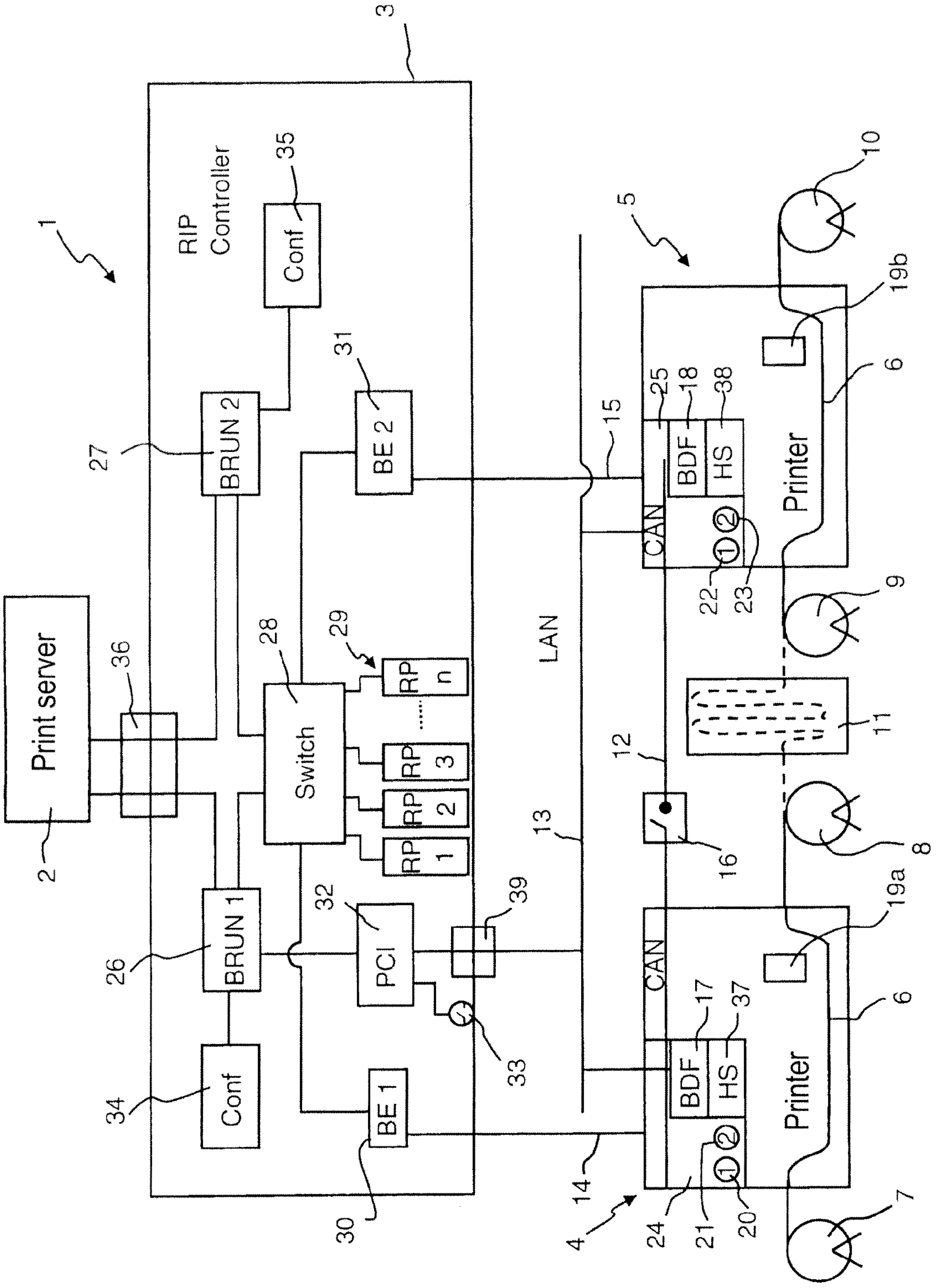
FIG. 1 illustrates a tandem printing system.

For the purposes of promoting an understanding of the principles of the invention, reference will now be made to preferred exemplary embodiments/best mode illustrated in the drawings and specific language will be used to describe the same. It will nevertheless be understood that no limitation of the scope of the invention is thereby intended, and such alterations and further modifications in the illustrated embodiments and such further applications of the principles of the invention as illustrated as would normally occur to one skilled in the art to which the invention relates are included.

According to a first exemplary embodiment, a tandem printing system and a method to control such a printing system with two printing apparatuses and a corresponding computer system are provided, wherein the printing apparatuses can respectively be operated selectively in two different operating modes. In the first operating mode—what is known as the simplex mode—the two printing apparatuses print print jobs independently of one another. In the second operating mode—what is known as the duplex mode—print jobs are respectively processed jointly by two printing apparatuses. The printing apparatuses are connected with one another in terms of control, at least in the duplex mode. An activation operating unit is provided via which at least one of the two printing apparatuses for the simplex mode or both printing apparatuses for the duplex mode can be activated selectively.

The exemplary embodiment is based on the realization that—in a print production center in which a plurality of printing apparatuses must be operated in parallel, and switching between simplex mode and duplex mode must take place as necessary—a productivity increase can be achieved when the switching and/or activation of both printing apparatuses in the respective mode can take place directly and in particular with a single press of a button, in particular at one of the printing apparatuses. The time to activate the duplex mode separately at the second apparatus is thereby advantageously saved, and under the circumstances a wait must take place at both apparatuses until their computer-implemented, hardware- and software-based control has respectively reached a state upon booting in which the corresponding simplex or duplex activation has taken place; and additional settings can be made. In particular, it can be avoided that the two printing apparatuses boot independently of one another with different, incompatible settings, and therefore one of the apparatuses must be rebooted again later with different settings that are compatible with the settings of the other apparatus. The advantage can thereby be achieved that both printing apparatuses already certainly have the necessary identical or compatible settings (for example with regard to the supported page description language) upon first boot. Information about the desired operating state and/or additional settings can thereby already be transferred automatically at boot from the first printing apparatus to the second printing apparatus, such that input errors by operators are avoided.

The described procedure is particularly advantageous when printing apparatuses store the last valid settings (including the operating mode) after the deactivation, and these are loaded again into their controllers by default at the next activation. Via the exemplary embodiment it can then be achieved that possibly different settings of the second printing apparatus—in particular the duplex setting—are already adopted upon activation of the first printing apparatus, and thus the necessary agreements of the apparatus settings are provided automatically after booting.

The activation operating unit can in particular be provided in at least one printing apparatus. It can be—but however does not necessarily need to be—permanently connected mechanically with the printing apparatus or mechanically integrated into this. It can be functionally connected with the first printing apparatus but can, for example, be accommodated in an operating console mechanically separate from the first printing apparatus but associated or connected with it functionally, organizationally (in terms of its control) and/or in terms of data.

In one advantageous embodiment of the invention, it is provided that the two printing apparatuses have a common control component, for example a common Raster Image Processor (RIP) Controller, and this control component is likewise operated selectively and in a simplex mode or a duplex mode, corresponding to the operating mode of the two printing apparatuses. If the first printing apparatus is booted into simplex mode, it can additionally be provided that at the second printing apparatus only one operating unit is activated with which this printer is likewise activated in simplex mode. Its operating unit can then be blocked for the duplex mode. Disruptions of the printing system that could arise due to an inadvertent later starting of the duplex mode at the second printing apparatus can thereby be avoided.

With the exemplary embodiment, the advantage can in particular also be achieved in simplex mode that, given a disruption of one of the two printing apparatuses, the other printing apparatus continues to be operable. In particular, for this the resources and processes in the computer system controlling the printing system (in particular in the RIP controller) are sufficiently separated from one another, meaning that these are essentially operated independently of one another. This possibility is abetted via strict separation of the two operating modes of simplex mode and duplex mode, because then resources and processes can be organized very differently from the outset in single mode than in duplex mode.

The printing to one side of a recording material in particular respectively takes place in the two printing apparatuses. For example, the printing there can also take place in only one or in multiple first colors, for example only in black ink. In duplex mode, the two printing apparatuses respectively print print jobs jointly. In particular, in duplex mode a recording material is printed on both sides, wherein the first printing apparatus prints to a first side or the front side of the recording material and the second printing apparatus prints to the other side or the back side of the recording material. Alternatively or additionally, it can be provided that the first printing apparatus prints only in one or in multiple first colors and the second printing apparatus prints in one or more second colors. Among the second colors, an available color can in particular be different than the available colors of the first printing apparatus. The printing apparatuses can also print with the most varied types of printing materials and/or based on different printing technologies; for example, the first printing apparatus can print with toner based on electrophotographic technology, and the second printing apparatus can print with ink based on inkjet technology, or the first printing apparatus can print with ink material for the print colors cyan (C), magenta (M), yellow (Y) and black (K), and the second printing apparatus can print with Magnetic Ink Character Recognition (MICR) material.

The recording material to be printed can in particular be in the form of a web. In duplex mode the print data of the print job are in particular divided up per page to the two printing apparatuses so that the association of the printed data on the front sides and back sides is maintained.

In a further advantageous exemplary embodiment of the invention, the activation operating unit has a mechanical switching arrangement with which the simplex operating mode or the duplex operating mode can be selectively activated. A first button for the activation of the simplex mode and a second button for the activation of the duplex operating mode can thereby be provided. In particular, a first switch for the activation of the simplex mode and a second switch for the activation of the duplex operating mode can be provided for this. The switches can be designed as push buttons. However, the switching arrangement can also be designed differently and, for example, can comprise only a single or multiple selection switch(es) in the form of a rotary switch or toggle switch in which the buttons are formed by two switch positions or switch settings. They can also be provided in the form of software-controlled operating buttons that are displayed in a graphical user interface, or with corresponding different means for operation of an apparatus. For example, buttons for simplex mode, for duplex mode and/or for a deactivation state can be provided. Additional buttons can also be provided for additional operating states.

In particular, each of the two printing apparatuses has a respective switch to activate the tandem printing system in simplex mode and a switch to activate the tandem printing system in duplex mode. With these switches the advantage can be achieved that controllers of the two printing apparatuses and the controller (RIP controller) superordinate to the printing apparatuses can, for example, be operated in a standby mode, and the superordinate controller—and then the two printing apparatuses—can be successively activated in exactly the right mode with the correct settings via a simple mechanical pressing of the respective button. On the one hand, the activation process can thereby be started decentrally at one of the two printing apparatuses, and on the other hand the activation process can be monitored centrally via the superordinate controller for the two printing apparatuses. For example, for activation the controllers can be activated from a standby state via a computer network function ("boot on LAN", for example), or even from a completely unpowered, deactivated state via a targeted current feed.

The printing apparatuses can respectively have an apparatus control device, and the two apparatus control devices can be linked with one another (at least in the duplex operating mode) to couple the printing apparatuses. Furthermore, for both printing apparatuses selectively separated print data processing devices or a common print data processing device can be provided that receive(s) and process(es) print data and output(s) the processed print data to one of the two printing apparatuses or to both printing apparatuses. The print data processing device can be set differently depending on the activated operating mode of the printing apparatuses or of the entire printing system. In particular, depending on the activated operating mode one or more raster processor devices (Raster Image Processors, RIPs) can thereby be configured, used and/or associated with the printing apparatuses differently.

According to a second embodiment that can be used in combination or even independently of the first embodiment, a method or a computer system is provided to control a printing system with a first printing apparatus and a second printing apparatus, wherein a print data interface is used to receive print data that are coded in a page description language. Furthermore, a raster image processor with multiple raster processor units to generate raster image data from print data of a print job is provided, as well as at least one printer interface for selective output of the raster image data to the first printing apparatus and/or to the second printing apparatus, and for bidirectional communication with the printing apparatuses. At least one control computer controlling the raster image processor is provided in the computer system. If an activation signal is sent to the computer system and the activation signal comprises mode information as to whether the operation is provided in a simplex mode or a duplex mode, an activation and configuration device of the computer system then enables a power supply for at least the control computer as a reaction to the activation signal. At least the raster image processor is then configured by means of the mode notification so that, in simplex mode, it processes the print data of the print job independently per printing apparatus and outputs them to the respective printing apparatus, and in duplex mode processes the print data of the print job jointly and selectively outputs them to the two printing apparatuses.

Furthermore, it can thereby be advantageously provided that the activation and configuration device and/or the control computer also enables a power supply for the raster processor units as a reaction to the activation signal. Furthermore, it can be provided that, as a reaction to the activation signal and/or depending on the mode notification for a per-printing apparatus, independent processing of the print data, a first group of raster processor units is enabled only for processing of print data for the first printing apparatus, and for joint processing of the print data the first group of the processor units is enabled for processing of all print data.

The second embodiment is based on the realization that a tandem printing system can be configured simply if a computer system is provided with which, on the one hand, activation processes of the printing apparatuses and the units (in particular a raster image process) are matched to one another so that all essential system components essentially simultaneously adopt the same operating state (with regard to the simplex mode or duplex mode) in the course of the activation process.

According to the second embodiment, it is advantageously possible to use a single computer system to control a tandem printing system. In particular, it can be designed as an independent structural unit and be arranged spatially outside of the two printing apparatuses, and merely be connected (in terms of control and/or data) with the printing apparatuses via one or more data lines or interfaces. For its part it can likewise have one or more activation arrangements with which the computer system itself can be wholly or partially activated, or with which the printing system as a whole can be activated. For activation of the printing system in simplex or duplex mode, an activation device can be designed wholly or partially as described above for one of the printing apparatuses. At least one of the activation arrangements of the printing system can be designed so that only the first printing apparatus is selectively activated in simplex operation; only the second printing apparatus is activated in simplex operation; both printing apparatuses are respectively, individually activated in simplex operation; or both printing apparatuses are activated in duplex operation. In order to be able to exchange information about the operating state or about a change at any time, at least one system component in all participating apparatuses of the printing system (in particular in both printing apparatuses and in the computer system) is thereby respectively, advantageously in a standby state. For example, an interface with at least substantial control capabilities for other system components of the same apparatus (such as the activation of a power supply) is provided. In such a standby operating state the interface can then activate additional apparatus components upon the arrival of an activation signal. The computer system can in particular be at least partially superordinate (in terms of their control) to internal controllers in the printing apparatuses.

With the exemplary embodiment, in simplex mode a portion of the resources provided by the computer system—in particular a portion of the raster processor units—can respectively be used for a largely independent processing of print data for the two printing apparatuses of the tandem printing system, such that print jobs can essentially be executed independently of one another at the two printing apparatuses. The connection between the computer system and the controllers internal to the printing apparatuses essentially takes place independently of one another. In contrast to this, in duplex mode the computer system is reconfigured so that it essentially operates as one unit for both printing apparatuses, meaning that essentially all resources of the computer system can be used jointly for the tandem printing unit.

According to one advantageous embodiment of the invention, the computer system comprises at least one primary computer that controls multiple secondary computers that are of similar design among one another. In particular, the computer system can thereby be designed as what is known as a blade server system, wherein the primary computer can be designed as what is known as a bladerunner computer and the secondary computers can be designed as what are known as blade computers. Bladerunner computers are largely independent servers that can be designed as master computers. Blade computers can utilize the same resources, be centrally administered and have a common power supply and ventilation. The blade computers can be designed as modules, be inserted into corresponding slots in supply cabinets with structural design technology, and can thereby be automatically connected among one another. As already mentioned, such blade server systems are available from Hewlett Packard Inc., for example.

According to a further advantageous exemplary embodiment, the activation and configuration device comprises a power supply monitoring device which, after receiving the activation signal, activates the power supply for the primary computer and/or simultaneously for all secondary computers.

Furthermore, in the computer system or in the activation and configuration device a network interface to the first printing apparatus can be provided via which the activation signal and/or the mode notification can be transmitted and interpreted. Activation signal and mode notification can in particular be designed as a combined network message (frame).

In the course of the activation process, settings to confirm or to select the simplex mode or the twin mode of the printing system, regarding the page description language of print data, regarding printing speed, regarding print image resolution, regarding measurements of a recording material placed in a printing apparatus, regarding printable colors, and/or regarding additional parameters can advantageously be input via a graphical user interface or via another input capability (toggle switches, for example), or can be established using the imported mode notification for the computer system and/or the printing apparatuses or for the entire tandem printing system.

In the graphical user interface, it can be advantageous to create a plurality of configurations with setting values for simplex mode and duplex mode, to store these and to present these predetermined configurations, such that one of the configurations can be selected by a user in the course of the activation process of the tandem printing system. The configurations can be at least partially printing apparatus-specific (i.e. different) depending on at which of the two printing apparatuses the activation process is initiated. In particular, at the start in simplex mode the selection of the correct configuration can thereby be facilitated or designed more clearly because configurations for simplex operation of the other printing apparatus as well as configurations of the duplex operation are not displayed for selection. Display and selection can in particular take place at the control panel of the respective printing apparatus at which the activation button was pressed. For this the printing apparatus essentially initially starts only those of its components (software and hardware) that are required to provide the control panel (possibly with the graphical user interface and the selection of the configuration), and only starts the remaining control components when the entire configuration—i.e. the operating mode and the settings selected for this—are fixed. In this type of activating process it can be sufficient that respectively only one activation button is provided at the printing apparatuses, with which activation button the selection of the configuration of the tandem printing system can only take place at the respective apparatus via the control panel, in the course of the activation process. The control panel can thereby already interact with portions of the superordinate control computer (RIP controllers), and in the course of this the control panel can produce the effect that the corresponding portions of the superordinate control computer are activated. However, within the scope of the exemplary embodiment it can also be provided to control the activation process for the duplex printing system and the respective configuration without a graphical user interface, for example via at least one button or via a wired connection or wirelessly by means of a remote control, in particular via a data network (LAN, WAN).

The settings or configurations that are made or selected can be output or relayed from the computer system to controllers of the printing apparatuses, in particular to control components for printing aggregates and to respective control panels of the printing apparatuses. These control panels can in particular have graphical user interfaces. In a completely activated state of the tandem printing system, a control panel can in particular have different, operating mode-specific operating elements, graphical design and/or different enabling of functions. For example, in duplex mode the modification of specific setting values that are required in the other printing apparatus can be blocked in the control panel of one printing apparatus.

Given a change between simplex mode and duplex mode, it is not absolutely necessary to reset all components of the computer system. In the course of the activation process it can be sufficient to establish new setting values only in a portion of the components of the computer system.

Additional aspects, advantages and effects of the exemplary embodiments are clarified using the following description and drawing figures.

The tandem printing system 1 shown in FIG. 1 comprises a print server 2 with which a plurality of print jobs can be administered and sent as necessary via a print data interface 36 to a raster image processor controller (RIP controller) 3 whose print data are encoded in a page description language. In the RIP controller 3, the print data are rastered into raster images (bitmaps) and the raster image data are sent via a first output interface (back end 1) 30 to a first printing apparatus, or via a second output interface (back end 2) to a second printing apparatus 5. In the respective printing apparatus, the corresponding print data are printed by means of print heads 19 onto a paper web 6. The RIP controller 3 controls the output of the print data via the output interfaces 30, 31 corresponding to the "simplex" or "duplex" operating mode that is set in the tandem printing system 1. In the simplex mode, print jobs are associated per job with only one of the two printing apparatuses 4, 5, such that a complete print job is respectively transferred via the output interface 30 or 31 and the respective data connection 14 or 15 to the assigned printing apparatus 4, 5 and is printed in its entirety there.

In simplex mode of the printing apparatus 4, the paper web 6 is unwound from a paper roll by means of an unrolling device 6, supplied to the printing apparatus 4 and—after printing—wound again on a paper roll by means of a first roll-up device 8. Analogous to this, print jobs that are printed entirely in the printing apparatus 5 in simplex mode are printed on the paper web 6 in that this is printed and processed by means of the unrolling device 9, the print heads 19 arranged in the second printing apparatus 5 and the roll-up device 10.

In contrast to this, in duplex mode a print job arriving from the print server 2 at the RIP controller 3 is rastered and separated into pages so that successive pages of the print job are respectively, alternately printed in the printing and/or 4 and in the printing apparatus 5. The paper web 6 is thereby buffered in a buffer unit 11 between printing apparatus 4 and printing apparatus 5 and, before the printing in the second printing apparatus 5, it is turned so that the front side of the paper web 6 is printed in the printing apparatus 4 and its back side is printed in the printing apparatus 5. Furthermore, in this print operation mode the buffer device 11 replaces the roll-up device 8 and the unrolling device 9, such that in this mode the paper web 6 is unrolled from the unrolling device 6, supplied to the printing apparatus 4, then is supplied to the storage device 1, is subsequently printed in the printing apparatus 5, and finally the paper web 6 printed on the front and back side is rolled up by the roll-up device 10.

Diverse control devices, control interfaces and control lines are provided to control the tandem printing system 1. Within the printing apparatuses 4, 5, respective components for a bus connection 12 according to the CAN standard are provided for the control devices there, for example respectively: a primary control device 37, 38; aggregate control devices for the print heads 19*a*, 19*b*; a paper transport device; and control panels 17, 18. Depending on the operating mode, in simplex mode CAN bus connections can naturally be respectively provided in the printing apparatuses 4, 5 that have no connection to the CAN bus connection of the respective other printing apparatus 4, 5. In contrast to this, in duplex mode the two bus connections of the printing apparatuses 4, 5 are interconnected so that at least one primary apparatus controller of the first printing apparatus 4 can communicate with one another with a primary apparatus controller of the second printing apparatus 5. By switching the respective primary apparatus controllers, all components of the first apparatus controller 24 in the first printing apparatus 4 can communicate with all components of the second apparatus controller 25 in the second apparatus controller 5. The switchover of the CAN bus connections between simplex mode and duplex mode can take place via a CAN bus switch 16. The switch 16 can be switched automatically into one of the two corresponding switch states ("simplex mode/CAN buses are disconnected" or "duplex mode/CAN buses are connected") by the first or second apparatus controller 24, 25 or by the RIP controller 3, depending on the activated operating mode of the tandem printing system 1.

Additional details with regard to the CAN bus switch 16 are described in the already aforementioned US patent application with the applicant's Ser. No. 13/357,125 and the title "Printing System With Multiple Data Bus Segments", filed simultaneously with this application by the applicant. The content of this patent application is incorporated again by reference into the present Specification.

Various components are provided to activate the tandem printing system 1. On the one hand, a power supply switch 33 is provided to the RIP controller 3, given the operation of which power supply switch 33 the power supply control interface (Power Control Interface, PCI) 32 supplies a portion of the components of the RIP controller 3 with voltage or current. The RIP controller 3 thereby passes into a standby state in which it can receive signals and/or messages from the outside, in particular via a LAN bus connection 13 according to the TCP/IP standard with an SNMP (Simple Network Messaging Protocol) or as UDP messages (User Datagram Protocol frames), by means of which signals and/or messages the RIP controller 3 is completely started up (booted) and thereby passes into an operating state as required by the message with regard to simplex mode or duplex mode.

Corresponding signals or messages—in particular from the two apparatus controllers 24, 25 or their primary controllers 37, 38 of the printing apparatuses 4, 5—can be sent via the LAN connection 13 and a LAN interface 39 to the RIP controller 3. In the printing apparatus 4, a mechanical simplex switch 20 and a mechanical duplex switch 21 are provided for this. In the printing apparatus 5, corresponding mechanical simplex switch 22 and duplex switch 23 are provided. Upon operation of a simplex switch 20, 22 at one of the two printing apparatuses 4, 5, the apparatus controller 24 or 25 sends a corresponding message via the LAN connection 13 to the power control interface 32 of the RIP controller 3. From this the power control interface 32 recognizes that a printing operation should be accepted and activates the power supply for the bladerunner 26, 27. Using the activation signal/activation message, it can also recognize whether a simplex or duplex operation is provided, and possibly at which of the two connected printing apparatuses the simplex operation should take place. It activates the power supply for the first bladerunner 26 and/or for the second bladerunner 27 corresponding to the operating mode. The power supply for other components of the RIP controller 3 can also be activated simultaneously.

The message of which of the two printing apparatuses 4, 5 should be operated in which state or in which mode the tandem printing system 1 should be started up is also relayed to the first bladerunner 26 and/or to the second bladerunner 27; in particular, the power control interface 32 sends corresponding mode messages there.

Via the network switch arrangement 28—which, depending on the network type (LAN or Infiniband, for example) comprises suitable network switches—the bladerunners 26, 27 control the raster process units RP1, . . . , RPn of the raster process blade computers 29. The raster process units RP1, . . . , RPn are respective blade computers designed like plug-in cards. They are accommodated together in a frame (blade enclosure) and thus form the raster process blade computer 29. The enclosure includes a power supply device via which all blade computers are supplied with current, and furthermore includes the switch arrangement 28 as well as fans to cool the blade computers.

In the case of a simplex mode, the two bladerunners 26, 27 are connected to respective, independent control units in the RIP controller 3 that activate and use the raster process blade computers 29 so that print data of a print job are sent to only one of the two printing apparatuses 4, 5. As a reaction to the activation and/or depending on the respective mode message, the first bladerunner 26 activates the second bladerunner 27 and/or the raster processor blades RP1 . . . RPn and establishes its scope of use or usage mode. For example, for an independent simplex operation of both printing apparatuses 4, 5, of twelve available raster processors RP1, . . . , RP12 only a first group of the first six processors RP1, . . . , RP6 is activated and used for the processing of print data for the first printing apparatus 4. In contrast to this, a second group with the last six processors RP7, . . . , RP12 is activated and used only for the processing of the print data for the second printing apparatus 5. In contrast to this, in a duplex operation both groups of raster processors—i.e. all raster processors—are activated and used together to process all print data, and the print data that are respectively generated in such a manner are distributed to the two printing apparatuses 4, 5 according to predetermined rules, for example per print job, per front/back side with regard to the document, or per color separation.

In contrast to this, if the duplex switch 21 or 23 is pressed in one of the printing apparatuses 4, 5, a corresponding message passes to the power control interface 32, which in turn configures the RIP controller 3 in duplex mode. The bladerunner computer 27 is thereby deactivated, and all print data are sent from the print server 2 to the bladerunner computer 26 in which the print job is in turn divided up and assigned to the raster process blade computers 29, and the rastered print data are sent in alternating fashion per page to the first printing apparatus 4 or second printing apparatus 5.

The bus switch arrangement 28 (switches)—via which the network or bus connections can be switched between the connected bladerunner computers 26, 27, the raster process blade computers 29 (RP1, . . . , RPn) and/or the output interfaces 30, 31—furthermore serve for alternating configuration of the RIP controller 3 in simplex mode or duplex mode. The communication of the connected participants by means of the circuit arrangement is very fast.

The first bladerunner computer 26 is connected with a first configuration memory 34 via which apparatus configurations with system settings for the first printing apparatus 4 can be stored, and in particular via which the last valid configuration is stored upon deactivation of the system. Corresponding configuration data for both printing apparatuses 4, 5 in duplex mode are also stored in the configuration memory 34. Corresponding configuration data for the second printing apparatus 5 in its simplex mode are stored in a second configuration memory 35 that is connected with the second bladerunner computer 27. In the course of an activation process, these configurations are transferred to the control panel 17 or the control panel 18 (via the LAN connection 13, for example) and are displayed there for suitable selection. The configuration selected at the control panel 17, 18 is then transferred back to the RIP controller 3, and the tandem printing system is activated as a whole with the corresponding configuration.

In running print operation, the two bladerunner computer 26, 27 receive print data from the print server 2 via the interface 36 and process these data in first processing steps. For example, a print data-specific analysis and interpretation (what is known as parsing) of the print data can take place, and the print data can be prepared for the subsequent raster process. The current availability or utilization of the raster processor unit 29 can then be checked per print job by the respective bladerunner computer 26, 27, and if necessary it can be established at which of the raster processors RP1, . . . , RPn the print data are rastered, i.e. it can be established which additional processes (tasks) are executed at which processor to execute the print job. In simplex mode, each of the bladerunner computers 26, 27 thereby considers which resources are associated with it or are activated for it. In duplex operation, the bladerunner computer 26 controlling the duplex operation normally has full access to all resources of the RIP computer 3. In this operating mode these can also comprise the second bladerunner computer 27, meaning that the first bladerunner computer 26 is then a master and the second bladerunner computer 27 is a slave.

These resources can be efficiently utilized via the tailored, flexible and/or variable (during the printing operation) association of the tasks with the available resources of the RIP computer 3, in particular those of the bladerunners, raster processors and/or bus connections (switches) by means of the bladerunner computers 26, 27. It is thereby advantageous to provide for a uniform utilization of these resources. In particular, a high transfer rate or transfer bandwidth can be achieved with a uniform utilization of the switches of the bus switch arrangement 28.

Figure 2:
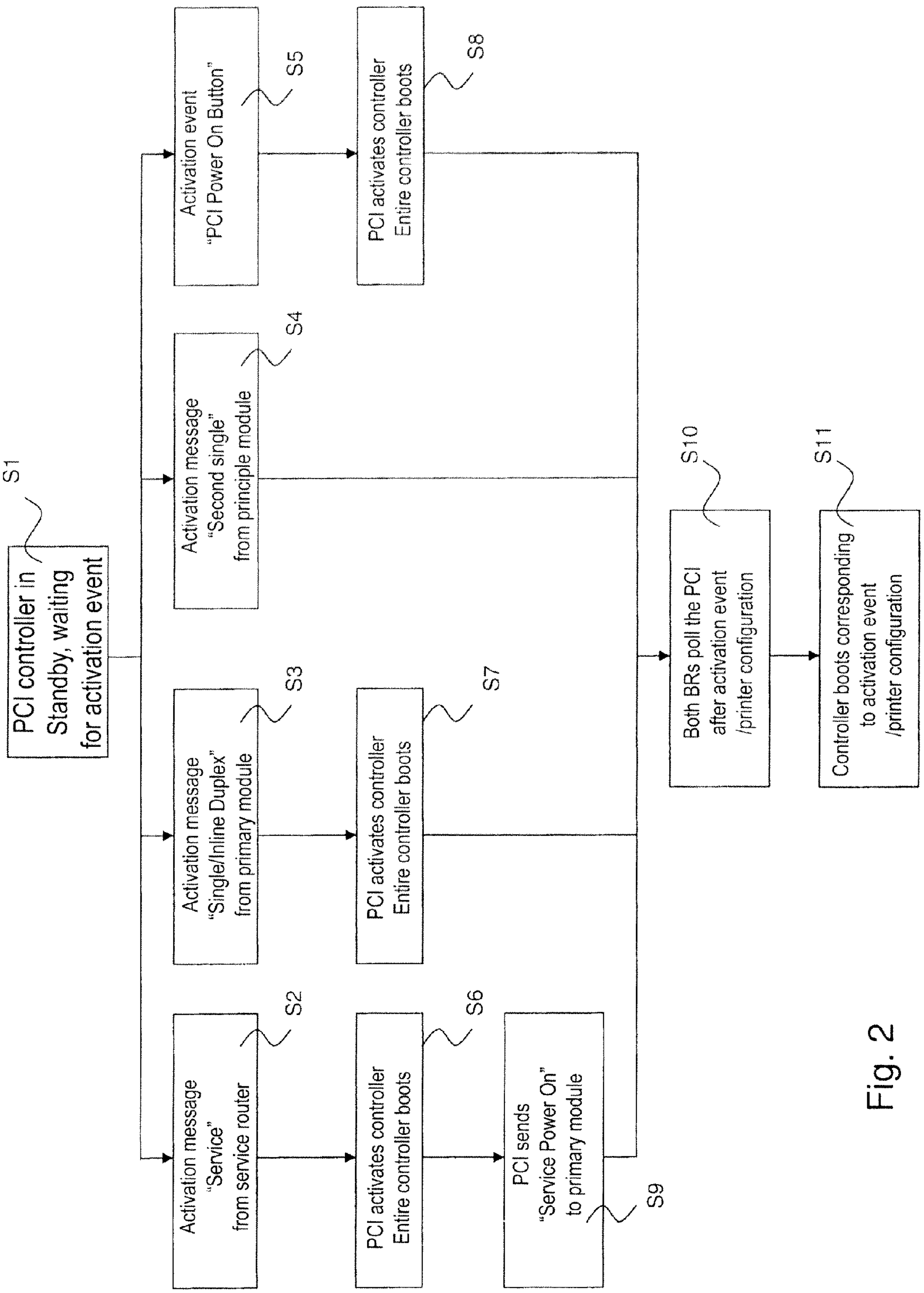
FIG. 2 shows a workflow diagram for the activation processes in the tandem printing system.

Various activation scenarios for the tandem printing system 1 are shown in FIG. 2. As abbreviations, BDF is used in this for control panel, BR is used for bladerunner and PCI is used for power control interface. In Step S1 the power control interface (PCI) is in a standby state and waits for signals that signal the activation of the entire system via the LAN connection 13.

The Steps S2, S3, S4 and S5 respectively initiate different activation procedures, wherein in Step S2 the system is activated in a service mode; in Step S3 a message for activation in simplex mode or duplex mode is received by the primary module in one of the printing apparatuses 4, 5. In the scenario of Step S4, it is assumed that a first printer in the printing system is already activated in simplex mode, and according to Step S4 the activation message (that this printing apparatus should also start up in simplex mode) is now received by the primary module of the second printing apparatus. In an alternative Step S5, the activation button 33 of the PCI module 32 is operated. This leads in Step S8 to the situation that the entire RIP controller 3 is activated with the last settings present in the RIP controller 3 according to the stored data in the configuration memories 34 and 35.

In Steps S6 and S7 (which follow Steps S2 or S3), the RIP controller 3 is likewise entirely activated, wherein in Step S6 the service mode is activated and a corresponding message ("service mode activated") is sent to the primary modules of the printing apparatus 4, 5. In Step S10 (which respectively directly follows Steps S7, S8 and S9), the bladerunner computers 26, 27 regularly poll the PCI module 32 as to whether a suitable printer configuration is present. In the event that such an activation event or such a printer configuration is found, the RIP controller 3 boots corresponding to this event or corresponding to this configuration.

Figure 3:
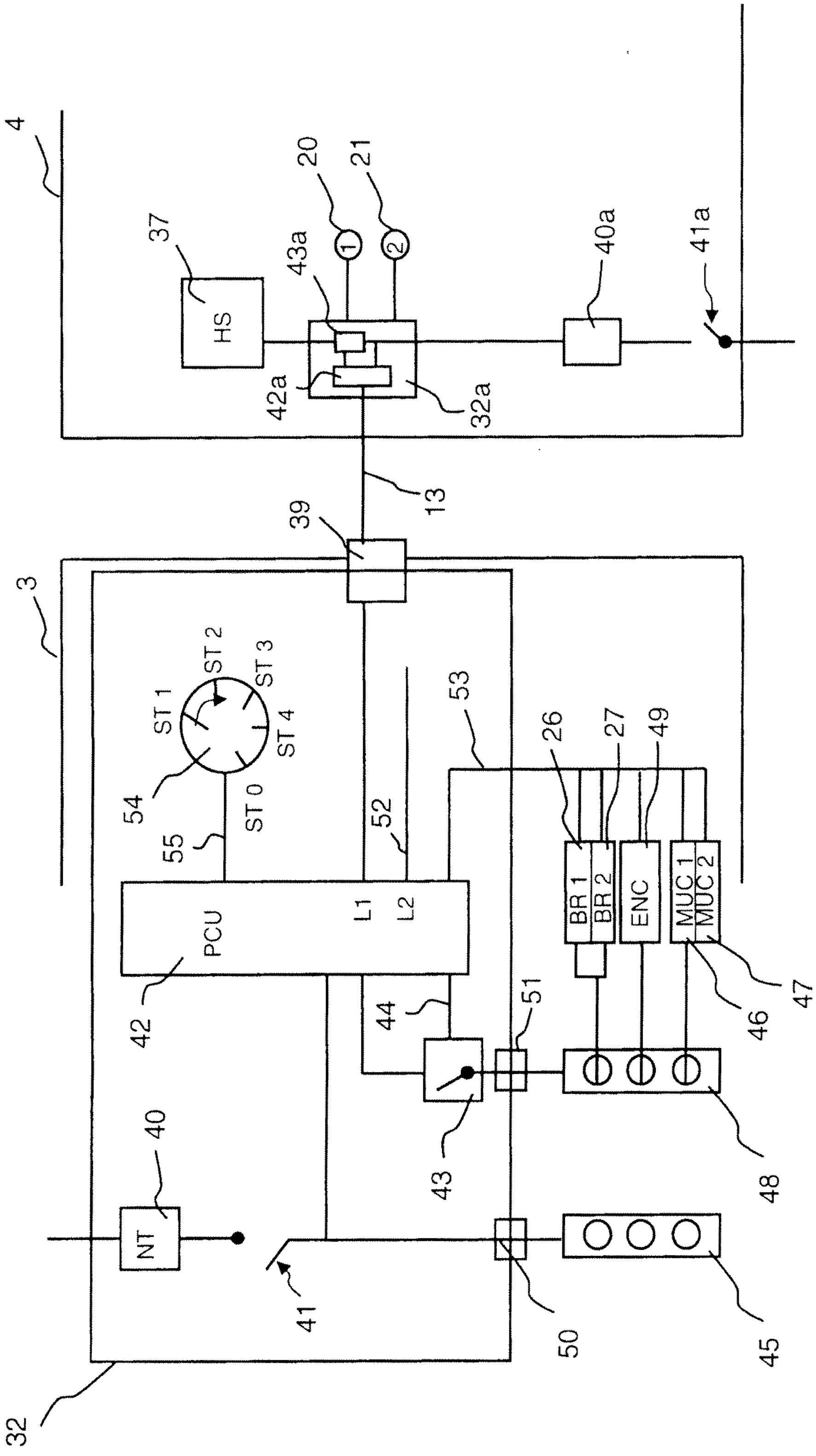
FIG. 3 illustrates a power supply monitoring system.

Shown in more detail in FIG. 3 are the power control interface 32 arranged in the RIP controller 3 and its connections to other apparatus components. Said power control interface 32 receives power from an external power supply (supply grid) via a mains adapter 40. It is activated by means of a primary switch 41 and automatically transitions into a standby mode in which it relays voltage/current only via an unswitched output 50 to the multiple socket outlet 45, and directly to the power control unit (PCU) 42 having a microprocessor. In particular, in this state no voltage is output to the switched output 51 and to the electrical socket 48 connected with this. The power control unit 42 controls the switch 43 via a control line 44, via which switch 43 the mains adapter 40 can be connected with the switched output 51. The power control unit 42 is flexibly programmable so that it can release or block the power supply for the socket bar 48 (and therefore the apparatuses connected with this) via the switch 43 depending on the different operating states, and in particular given its incoming activation signals.

Various additional components of the RIP controller computer 3 are connected to the socket bar 48, in particular the two bladerunner computers 26, 27, the enclosure frame 49 of the blade computer 29 and two image output processors 46, 47 (what are known as marking units that prepare the image data specific to the printing apparatus before they are output to the respective printing apparatus 4, 5 via the output interfaces 30, 31 shown in FIG. 1). For example, depending on the number of color stations or depending on the print speed, multiple marking units can thereby be provided per printing apparatus, for example one respective marking unit per inking system of the printing apparatus.

Furthermore, in FIG. 3 it is shown that, in addition to the interface 39 with which it can be connected with the primary controller 37 of the printing apparatus 4, the power control unit 42 has three additional inputs, namely two LAN network inputs 52, 53 via which it can receive and send messages and a signal input 55 via which it can receive switching signals. The switching behavior of the power control unit 42 can be controlled via all of these inputs, meaning in particular operating the switch 43 to activate the power supply for the switched output 52. Switch positions of a selector switch 54—in the present example the four positions "Apparatus off" (position ST0), "Simplex operation only printer 1" (position ST1), "Simplex operation only printer 2" (position ST2), "Simplex operation both printers" (position ST3) and "Duplex operation" (position ST4)—are polled via the signal line 55, which can also comprise multiple wires.

Via the LAN input 52, the power control unit 42 can be induced—for example from the outside by means of a network connection to a service computer—to activate the power supply and to start the RIP controller 3 in a specific service operating mode.

Via the LAN connection 53, the power control unit 42 can exchange control or configuration data with other components of the RIP computer, for example the information about the activated simplex/duplex operating mode, about page description languages to be supported, about paper width settings to be used, about print colors to be supported etc.

The connection between the power control unit 42 of the RIP computer 3 and the power supply, as well as the primary controller 37 of the printing apparatus 4, is also shown in FIG. 3. For this the printing apparatus 4 has a power control interface 32*a* that is essentially identical in design to the power control interface 32 of the RIP computer 3 that is shown above, and which is connected with this via the LAN connection 13. The power control interface 32*a* in particular comprises a corresponding power control unit 42*a* and a switch 43*a* (controlled accordingly by this) to activate the power supply. It is fed into the printing apparatus 4 via a primary switch 41*a* and a mains adapter 40*a*, and is supplied via the switch 43*a* to other units of the printing apparatus 4 (such as its primary controller 37, for example). In the printing apparatus 4 a standby state can thereby also be initially established in which only the power control unit 42*a* is fed with current, and wherein the remaining apparatus units are activated successively whether via the switches 20, 21 or from the outside via the LAN connection 13, corresponding to the selected simplex/duplex operating mode. Conversely, the signals of the switches 20, 21 or, respectively, messages derived from these can be relayed via the LAN connection 13 to the power control interface 32 and therefore produce the activation of the RIP computer 3 and/or of the second printing apparatus 5.

Although the tandem printing system in the above exemplary embodiments prints to web-shaped recording materials, it is clear that the system or the two printing apparatuses can also be designed for corresponding printing of single pages. The RIP computer can simultaneously be connected to multiple computers delivering print data, i.e. to multiple print servers and/or to multiple other computers such as workstation computers or host computers.

Monitored activation processes for the tandem printing system have been described in the exemplary embodiments. It can likewise be provided to provide monitored deactivation processes that are initiated via corresponding buttons mounted at the apparatuses and/or via corresponding control panel commands. In particular, it can thereby be provided to secure current configuration or setting data in a memory, and to provide said data for selection and reuse given a later reactivation of the tandem printing system or to load said data as primary, automatically predetermined (default) configurations and settings.

The exemplary embodiment can also be used for printing systems in which more than two printing apparatuses or printing units are selectively interconnected in order to process print jobs together, for example a triplex system with three printing apparatuses that are selectively operable individually or connected together in a network. It is thereby clear that, in such larger systems, one or multiple duplex systems in which the operating mode of the printing apparatuses can also be viewed as a duplex mode can respectively also arise via the interconnection.

The described hardware and software components can respectively be wholly or partially integrated into an analog or digital apparatus controller. They can be provided as separate structural modules with corresponding interfaces to other control components or computer components. The exemplary embodiment is thereby suitable for realization on a computer.

The exemplary embodiment can be distributed as a file on a data medium such as a diskette or CD-ROM/DVD-ROM, or as a file via a data or, respectively, communication network. Such and comparable computer program products or computer program elements are embodiments of the invention.

The workflow according to the exemplary embodiment can be applied in a computer. It is thereby clear that corresponding computers on which the exemplary embodiment is applied can include additional known technical devices such as input means (keyboard, mouse, touchscreen), microprocessors, a data or, respectively, a control bus, a display device (monitor, display) and a working memory, a fixed disk storage and interfaces (a network card, for example).

Although preferred exemplary embodiments are shown and described in detail in the drawings and in the preceding specification, they should be viewed as purely exemplary and not as limiting the invention. It is noted that only preferred exemplary embodiments are shown and described, and all variations and modifications that presently or in the future lie within the protective scope of the invention should be protected.

We claim as our invention:

1. A printing system, comprising:

a first printing apparatus and a second printing apparatus that are respectively, selectively operable in simplex mode and duplex mode;

each of the first and second printing apparatuses in the simplex mode processing print jobs independently of the respective other printing apparatus, and in the duplex mode respectively processing print jobs jointly by both of the printing apparatuses;

the printing apparatuses being connected with one another in terms of control at least in the duplex mode; and an activation operating unit in one of the printing apparatuses via which said one of the two printing apparatuses is selectively activated for the simplex mode or both of the printing apparatuses are selectively activated by said same activation operating unit for the duplex mode.

2. The printing system according to claim 1 wherein the activation operating unit comprises a mechanical switch arrangement with a first pushbutton for the activation of the simplex mode and a second pushbutton for the activation of the duplex mode.

3. The printing system according to claim 1 wherein the printing apparatuses respectively have an apparatus controller device, and the apparatus controller devices are connected with one another at least in the duplex mode to couple the printing apparatuses.

4. The system of claim 1 wherein another of said activation operating units is provided in the other of the two printing apparatuses via which said other of the two printing apparatuses is selectively activated for the simplex mode or both of the printing apparatuses are selectively activated by said same another of said activation operating units for the duplex mode.

5. A printing system, comprising:

a first printing apparatus and a second printing apparatus that are respectively, selectively operable in simplex mode and duplex mode;

each of the first and second printing apparatuses in the simplex mode processing print jobs independently of the respective other printing apparatus, and in the duplex mode respectively processing print jobs jointly by both of the printing apparatuses;

the printing apparatuses being connected with one another in terms of control at least in the duplex mode;

an activation operating unit via which at least one of the two printing apparatuses is selectively activated for the simplex mode or both of the printing apparatuses are selectively activated for the duplex mode: and a common print data processing device being provided for both printing apparatuses, said common print data processing device receives print data, processes the print data and outputs the processed print data to one of the two printing apparatuses or to both of the printing apparatuses depending on the activated operating mode.

6. The printing system according to claim 5 wherein the print data processing device is set differently depending on the activated operating mode of the printing apparatuses.

7. The printing system according to claim 6 wherein the common print data processing device comprises a raster processor device whose raster processor units are configured, used and/or associated with the printing apparatuses differently depending on the activated operating mode.

8. A computer system to control a printing system with a first printing apparatus and a second printing apparatus, comprising:

a print data interface to receive print data that are encoded in a page description language;

a raster processor device with multiple raster processor units to generate raster image data from print data of a print job;

at least one printer interface to selectively output the raster image data to at least one of the first printing apparatus and the second printing apparatus;

an activation and configuration device that enables a power supply for at least the raster processor units upon an activation signal sent out by one of the first and the second printing apparatuses; and the activation and configuration device also establishing a simplex mode or a duplex mode for at least one of the first and second printing apparatuses upon a mode message sent out by one of the first and the second printing apparatuses, the activation and configuration device also configuring the respective raster processor unit so that in the simplex mode it processes the print data of the print job for the respective printing apparatus and outputs the print data to the respective printing apparatus, and in the duplex mode the activation and configuration device outputting the print data of the print job selectively to the first and the second printing apparatuses.

9. The computer system according to claim 8 comprising at least one primary computer that controls multiple secondary computers that are similar to one another.

10. The computer system according to claim 9 wherein the activation and configuration device comprises a power control device which simultaneously activates the power supply for the at least one primary computer and the secondary computers after receiving the activation signal.

11. The computer system according to claim 8 wherein a network interface is provided for a connection to the first printing apparatus via which network interface the activation signal and/or a mode message is transmitted.

12. The computer system according to claim 8 in which, in the course of the activation process, settings are provided for confirmation or for selection of the simplex mode or the duplex mode of the printing system regarding a page description language of print data, regarding a print speed, regarding a print image resolution, regarding measurements of a recording material placed in the printing apparatus, and/or regarding printable colors input via a graphical user interface or are established using an imported mode message.

13. The computer system according to claim 12 wherein configurations with predetermined values regarding the settings are shown from a plurality of predetermined configurations via a graphical user interface, and one of the predetermined configurations is selectable.

14. The computer system according to claim 12 wherein the settings that are made are output via at least one output interface to controllers of the printing apparatuses.

15. The computer system according to claim 12 wherein new setting values are established in the course of the activation process in only a portion of components of the computer system given a change between the simplex mode and the duplex mode.

16. A method to control a printing system that comprises a first printing apparatus and a second printing apparatus that are respectively, selectively operable in a simplex mode and a duplex mode, comprising the steps of:

in the simplex mode each of the first and second printing apparatuses processing print jobs independently of the respective other printing apparatus, and in the duplex mode respectively processing print jobs jointly by both of the printing apparatuses;

in the duplex mode connecting the printing apparatuses with one another in terms of control of the printing apparatuses; and with an activation operating unit of the first printing apparatus, selectively activating the first printing apparatus for the simplex mode or selectively activating with said same activation operating unit both of the printing apparatuses for the duplex mode.

17. The method of claim 16 wherein with another activation operating unit of the second printing apparatus, selectively activating the second printing apparatus for the simplex mode or selectively activating with said same another activation operating unit both of the printing apparatuses for the duplex mode.

18. A method for selective operation of a printing system that comprises a first printing apparatus and a second printing apparatus in at least one simplex mode or in a duplex mode, comprising the steps of:

providing a computer system with a print data interface via which print data that are encoded in a page description language can be received;

providing in the computer system a raster processor device with multiple raster processor units to generate raster image data from print data of a print job;

also providing in the computer system at least one control computer controlling the raster processor device;

sending an activation signal to the computer system, the activation signal comprising a mode information as to whether the operation is provided in the simplex mode or in the duplex mode;

with an activation and configuration device of the computer system enabling a power supply for at least the control computer as a reaction to the activation signal; and by means of the mode message, configuring at least the raster processor device so that in the simplex mode it processes the print data of the print job independently per printing apparatus and outputs the print data to the respective printing apparatus, and in the duplex mode processes the print data of the print job jointly and selectively outputs the print data to the two printing apparatuses.

19. The method according to claim 18 wherein for independent processing of the print data per printing apparatus a first group of raster processor units is activated only to process print data for the first printing apparatus, and for joint processing of the print data the first group of raster processor units is activated to process all print data.

20. A non-transitory computer readable storage medium storage a computer program tangibly embodied thereon to control a printing system that comprises a first printing apparatus and a second printing apparatus that are respectively, selectively operable in a simplex mode and a duplex mode, said program performing the steps of:

in the simplex mode each of the first and second printing apparatuses processing print jobs independently of the respective other printing apparatus, and in the duplex mode respectively processing print jobs jointly by both of the printing apparatuses;

in the duplex mode connecting the printing apparatuses with one another in terms of control of the printing apparatuses; and with an activation operating unit of the first printing apparatus, selectively activating the first printing apparatus for the simplex mode or selectively activating with said same activation operating unit both of the printing apparatuses for the duplex mode.

21. The non-transitory computer readable storage medium of claim 20 wherein with another activation operating unit of the second printing apparatus, selectively activating the second printing apparatus for the simplex mode or selectively activating with said same another activation operating unit both of the printing apparatuses for the duplex mode.

22. A non-transitory computer readable storage medium storing a computer program tangibly embodied thereon to control a printing system that comprises a first printing apparatus and a second printing apparatus that are respectively, selectively operable in a simplex mode and a duplex mode, said program performing the steps of:

providing a computer system with a print data interface via which print data that are encoded in a page description language can be received;

providing in the computer system a raster processor device with multiple raster processor units to generate raster image data from print data of a print job;

also providing in the computer system at least one control computer controlling the raster processor device;

sending an activation signal to the computer system, the activation signal comprising a mode information as to whether the operation is provided in the simplex mode or in the duplex mode;

with an activation and configuration device of the computer system enabling a power supply for at least the control computer as a reaction to the activation signal; and by means of the mode message, configuring at least the raster processor device so that in the simplex mode it processes the print data of the print job independently per printing apparatus and outputs the print data to the respective printing apparatus, and in the duplex mode processes the print data of the print job jointly and selectively outputs the print data to the two printing apparatuses.

* * * * *